United States Patent
Hyun

(10) Patent No.: US 10,492,479 B2
(45) Date of Patent: Dec. 3, 2019

(54) FISHING REEL HAVING EASILY ATTACHABLE AND DETACHABLE FRONT COVER

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/169,348

(22) Filed: Oct. 24, 2018

(65) Prior Publication Data

US 2019/0124904 A1  May 2, 2019

(30) Foreign Application Priority Data

Oct. 26, 2017 (KR) .................. 10-2017-0139888

(51) Int. Cl.
*A01K 89/01* (2006.01)
*A01K 89/015* (2006.01)

(52) U.S. Cl.
CPC .. *A01K 89/01921* (2015.05); *A01K 89/01912* (2015.05)

(58) Field of Classification Search
CPC ...... A01K 89/01912; A01K 89/019125; A01K 89/01915; A01K 89/01921; A01K 89/01922; A01K 89/01924
See application file for complete search history.

(56) References Cited

U.S. PATENT DOCUMENTS

| | | | | |
|---|---|---|---|---|
| 1,565,402 A | * | 12/1925 | Schmid ............ | A01K 89/01928 242/319 |
| 4,666,101 A | * | 5/1987 | Atobe .............. | A01K 89/01917 242/280 |
| 4,750,684 A | * | 6/1988 | Morimoto .......... | A01K 89/0192 242/310 |
| 4,775,113 A | * | 10/1988 | Emura ................ | A01K 89/057 242/268 |
| 4,807,827 A | * | 2/1989 | Welch .............. | A01K 89/01917 242/279 |

(Continued)

FOREIGN PATENT DOCUMENTS

| | | |
|---|---|---|
| JP | 62162969 | 10/1987 |
| JP | 04062068 | 5/1992 |

(Continued)

*Primary Examiner* — Emmanuel M Marcelo
(74) *Attorney, Agent, or Firm* — Cantor Colburn LLP

(57) ABSTRACT

A fishing reel having an easily attachable and detachable front cover. The fishing reel includes a body frame having first and second connecting portions on both side portions, a gear-side, first side cover connected to the first connecting portion, a palm-side, second side cover connected to the second connecting portion, and a front cover connected to the front portion of the body frame to protect a level wind. The front cover is bolt-coupled to a front end portion of the first connecting portion using a first bolt member, the first bolt member being coupled to the front cover while extending inward from an outer surface of the first side cover, such that a head portion of the first bolt member is exposed from the first side cover. The front cover is easily detached and attached using the first bolt member without complete detachment of the first side cover.

2 Claims, 3 Drawing Sheets

(56) References Cited

U.S. PATENT DOCUMENTS

| | | | | |
|---|---|---|---|---|
| 5,377,925 A * | 1/1995 | Miyazaki | A01K 89/01921 | 242/312 |
| 6,254,022 B1 * | 7/2001 | Katayama | A01K 89/01925 | 242/310 |
| 6,409,113 B1 * | 6/2002 | Hirayama | A01K 89/01557 | 242/310 |
| 10,253,826 B2 * | 4/2019 | Ahmad | F16D 23/12 | |
| 2004/0075005 A1 * | 4/2004 | Myojo | A01K 89/01921 | 242/310 |
| 2004/0144877 A1 * | 7/2004 | Kawasaki | A01K 89/01557 | 242/278 |
| 2005/0006512 A1 * | 1/2005 | Morimoto | A01K 89/045 | 242/306 |
| 2005/0056716 A1 * | 3/2005 | Kawasaki | A01K 89/00 | 242/310 |
| 2005/0224617 A1 * | 10/2005 | Nakagawa | A01K 89/01922 | 242/310 |
| 2007/0181728 A1 * | 8/2007 | Kawasaki | A01K 89/00 | 242/310 |
| 2008/0173745 A1 * | 7/2008 | Takechi | A01K 89/01903 | 242/321 |
| 2013/0193250 A1 * | 8/2013 | Ikebukuro | A01K 89/01903 | 242/261 |
| 2015/0083840 A1 * | 3/2015 | Kawamata | A01K 89/015 | 242/250 |
| 2015/0181853 A1 * | 7/2015 | Niitsuma | A01K 89/015 | 242/257 |
| 2016/0100563 A1 * | 4/2016 | Maruoka | A01K 89/05 | 242/295 |
| 2017/0303520 A1 * | 10/2017 | Hyun | A01K 89/01903 | |
| 2017/0328421 A1 * | 11/2017 | Ahmad | A01K 89/0189 | |

FOREIGN PATENT DOCUMENTS

| | | |
|---|---|---|
| JP | 2003125679 | 5/2003 |
| JP | 2014166151 | 9/2014 |
| KR | 19980032374 | 7/1998 |
| KR | 20050001347 | 1/2005 |
| KR | 20140086829 | 7/2014 |
| KR | 101749650 | 6/2017 |

* cited by examiner

FISHING REEL HAVING EASILY ATTACHABLE AND DETACHABLE FRONT COVER

CROSS REFERENCE TO RELATED APPLICATION

The present application claims priority to Korean Patent Application No. 10-2017-0139888, filed Oct. 26, 2017, the entire contents of which is incorporated herein for all purposes by this reference.

BACKGROUND OF THE INVENTION

Field of the Invention

The present invention relates generally to a fishing reel having an easily attachable and detachable front cover. More particularly, the present invention relates to a fishing reel including a body frame having first and second connecting portions on both side portions, a gear-side, first side cover connected to the first connecting portion, a palm-side, second side cover connected to the second connecting portion, and a front cover connected to the front portion of the body frame to protect a level wind, wherein the front cover is bolt-coupled to a front end portion of the first connecting portion using a first bolt member, the first bolt member being coupled to the front cover while extending inward from an outer surface of the first side cover, such that a head portion of the first bolt member is exposed from the first side cover. The front cover can be easily detached from and attached to the body frame using the first bolt member without complete detachment of the first side cover.

Description of the Related Art

In general, fishing reels, in particular, casting reels, have a similar structure, except for an operating structure of a brake dial or a tension nut depending on a braking mechanism of a spool. A typical fishing reel generally includes a body frame on which a spool is mounted, a first side cover (or a gear-side cover) connected to a first connecting portion on one side of the body frame, a second side cover (or a palm-side cover) connected to a second connecting portion on the other side of the body frame, and a handle provided on the first side cover.

Such a fishing reel has a guide hole provided in the front end portion of the body frame, more particularly, in a level wind. The guide hole allows a fishing line wound on the spool to pass therethrough, thereby guiding the fishing line to a top portion of a fishing rod. The level wind is configured to aid the fishing line to be uniformly wound on the entirety of the spool, so that the fishing line can be more easily unwound from the spool during casting, thereby increasing a casting distance.

The level wind is connected to a worm shaft connected to the front end portion of the body frame such that level wind can rotate laterally in forward and backward directions. The worm shaft has a bidirectional rail on an outer circumferential surface.

When the fishing line is wound on or unwound from the spool, the worm shaft rotates in concert with a spool shaft, and the bidirectional rail causes the level wind to laterally reciprocate in the longitudinal direction of the worm shaft. In this manner, the level wind aids the fishing line to be wound and unwound.

In this fishing reel, a front cover is connected to a portion of the body frame in front of the level wind, i.e. the front portion of the body frame, to protect the level wind from external impact.

When the fishing reel is used for a long period of time, a pin disposed within a cap of the level wind accommodated in the bidirectional rail is subjected to wear.

In particular, during fishing, the fishing line is wound on the spool, with impurities or muck contained in a body of water, such as a sea, lake, or river, being adhered thereto. In the process in which the fishing line is being wound on the spool, impurities or muck may move from the fishing line to the guide hole, thereby contaminating the bidirectional rail of the worm shaft. The contamination of the bidirectional rail may promote the wearing of the pin of the level wind.

It is therefore required to periodically perform impurity removal from the level wind and the worm shaft, as well as cleaning and greasing of the same, in order to extend the durability of the fishing reel.

In this regard, impurity removal and cleaning must be performed by detaching the front cover from the body frame, detaching the cap from the level wind, and then removing the pin from the level wind. In related-art fishing reels, connecting members by which the front cover is connected to the body frame are provided within the first and second side covers. It is probable that components may be dislodged or lost in an operation of detaching the front cover from the body frame. Accordingly, cleaning of the level wind or the like may be significantly difficult, which is problematic.

According to a typical configuration of related-art fishing reels, fastening members, such as bolts, extending inward through both side portions of the body frame are fastened to the front cover.

The palm-side, second side cover is configured to be easily opened and closed (or separated). In addition, the possibility of loss of components attached to the second connecting portion is low, since the components are protected by a spool cover or the like.

However, when the first side cover is detached, both the handles, a star drag, and the like must also be detached using a tool. Even in the case in which the first side cover is detached, a variety of components, including a gear train attached to the first connecting portion of the frame, are directly exposed to the outside. Since the operation of detaching the front cover is performed in this position, it is highly probable that a number of components attached to the body frame may be detached during the operation. Therefore, users may have much difficulty in maintenance and repair of the level wind, unless the users are experienced or are experts. This accordingly causes a problem in that users must visit specialty after-sales service (AS) centers for maintenance and repair of the level wind, which is costly and time-consuming.

In order to overcome such a problem, a product fabricated such that a portion of the front surface of the front cover is open has been introduced. The open portion in the front cover allows maintenance and repair to the level wind to be performed without detachment of the front cover.

However, this cannot be regarded as a fundamental solution for overcoming the above-described problem, since the main function of the front cover is to protect the level wind from external impact while preventing fingers holding the fishing reel during reciprocation of the level wind from being injured.

That is, the front cover having the open portion in front of the level wind suffers from reduced strength, and cannot properly function to prevent the level wind from being damaged and protect fingers from being injured.

For reference, related-art solutions relating to the front cover of the fishing reel may include Korean Patent Application Publication No. 10-2014-0086829, Korean Patent Application Publication No. 10-1998-032374, etc.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENTS

Patent Document 1: Korean Patent Application Publication No. 10-2014-0086829
Patent Document 2: Korean Patent Application Publication No. 10-1998-032374

SUMMARY OF THE INVENTION

Accordingly, the present invention has been made keeping in mind the above problems occurring in the related art.

The present invention proposes a fishing reel having a structure by which a front cover can be easily detached and attached. More particularly, the front cover is bolt-coupled to a front end portion of a first connecting portion using a first bolt member, and the first bolt member is coupled to the front cover while extending inward from an outer surface of the first side cover, such that a head portion of the first bolt member is exposed from the first side cover. Accordingly, the front cover can be easily detached from and attached to the body frame without complete detachment of the first side cover, so that users can perform maintenance, such as cleaning, by easily detaching a level wind without a danger of loss of components.

Also proposed is a fishing reel in which the first bolt member is coupled to the front cover by extending through both the first side cover and the first connecting portion in order to improve the coupling force of the front cover to the first connecting portion.

Also proposed is a fishing reel including a coupling protrusion protruding downward from a front end portion of one side surface of the front cover in surface contact with the first connecting portion to be coupled to the first bolt member, thereby improving the screw-engagement force of the first bolt member commonly used in coupling of the first side cover and the front cover.

Also proposed is a fishing reel including a second bolt member coupled to the second connecting portion by being inserted inward from an outer surface of the second connecting portion to extend through the front cover. The second bolt member can be easily used through the second side cover, which can be simply opened and closed, while improving the coupling force of the front cover to the second connecting portion.

In order to achieve the above object, according to one aspect of the present invention, a fishing reel may include: a body frame having first and second connecting portions on both side portions; a gear-side, first side cover connected to the first connecting portion; a palm-side, second side cover connected to the second connecting portion; and a front cover connected to the front portion of the body frame to protect a level wind.

The front cover may be bolt-coupled to a front end portion of the first connecting portion using a first bolt member, and the first bolt member may be coupled to the front cover while extending inward from an outer surface of the first side cover, such that a head portion of the first bolt member is exposed from the first side cover In the fishing reel according to the present invention, the first bolt member may be coupled to the front cover by extending through both the first side cover and the first connecting portion.

In the fishing reel according to the present invention, the front cover may include a coupling protrusion protruding downward from a front end portion of a side surface in contact with the first connecting portion, with the first bolt member being coupled to the coupling protrusion.

In addition, in the fishing reel according to the present invention, the front cover may be bolt-coupled to a front end portion of the second connecting portion using a second bolt member. The second bolt member may be coupled to the second connecting portion by being inserted inward from an outer surface of the second connecting portion to extend through the front cover.

According to the present invention, the fishing reel includes the first and second bolt members coupled inward from the outer surfaces of the first and second connecting portions to couple the front cover to the front portion of the body frame. In particular, the head portion of the first bolt member is exposed from the first side cover without being disposed within the first side cover, such that only the front cover can be easily detached from and attached to the body frame without complete detachment of the first side cover. Thus, inexperienced and non-expert users can easily perform maintenance, such as cleaning or repair, of the level wind.

Since the first side cover is not required to be completely opened in the detaching and attaching operation of the front cover and the maintenance or repair operation of the level wind, there is no danger of detachment or loss of internal components protected by the first side cover.

Coupling of the front cover can be more strongly maintained by the first bolt member commonly used for coupling of the first side cover and coupled to the front cover by extending through the first side cover and the first connecting portion and the second bolt member coupled to the second connecting portion by extending through the front cover.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
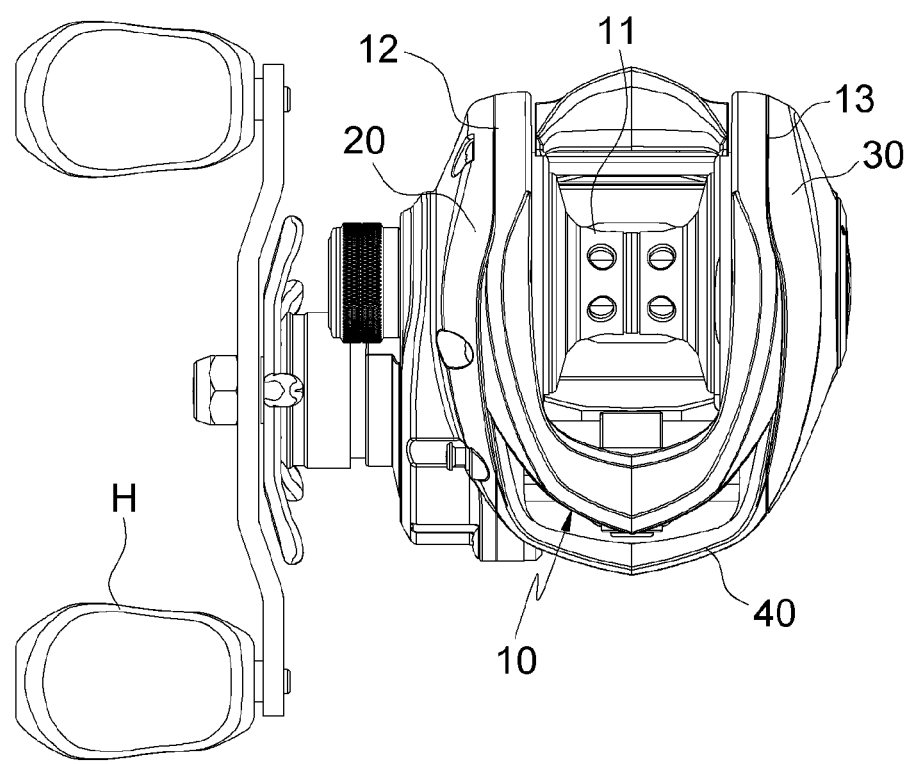
FIG. 1 is a perspective view illustrating a fishing reel according to an embodiment of the present invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or reference numerals having the same last two digits and letters refer to like elements having like functions throughout, and unless the context clearly indicates otherwise, elements referred to by reference numerals of the drawings should be understood based on this standard.

Also, for convenience of understanding of the elements in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as "a first ~" and "a second ~" are used only for the purpose for distinguishing a constitutive element from other constitutive element, but constitutive element should not be limited to a manufacturing order, and the terms described in the detailed description of the present invention may not be consistent with those described in the claims.

Figure 2:
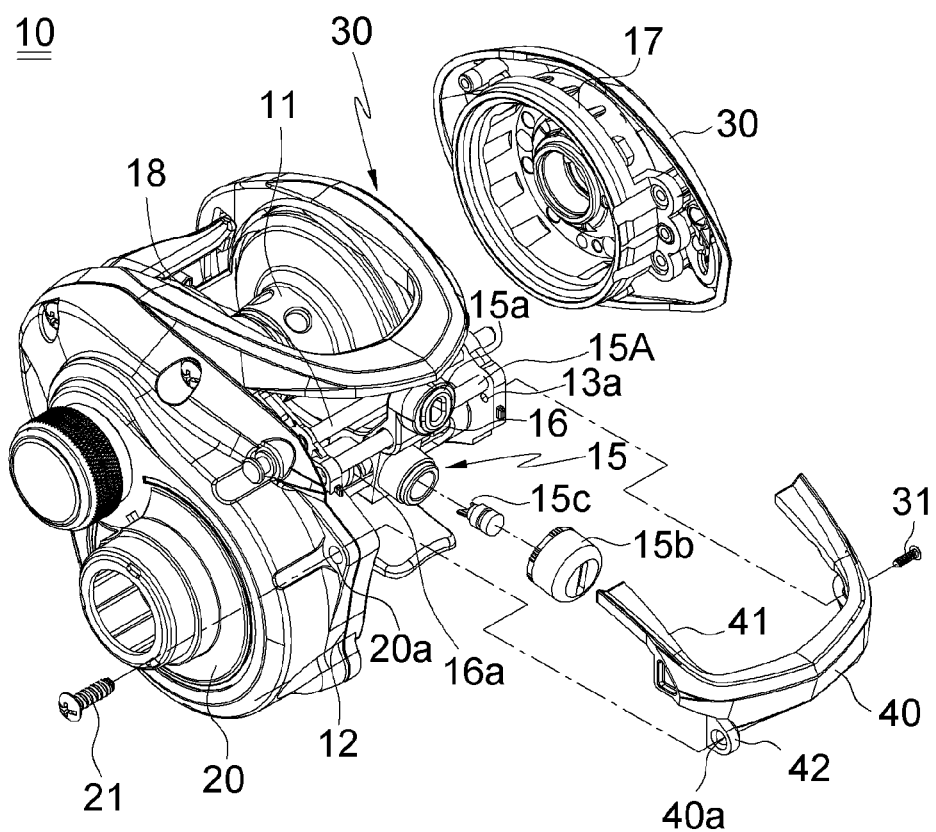
FIGS. 2 and 3 are exploded perspective views illustrating portions of the fishing reel according to the embodiment of the present invention.

In description of a fishing reel according to the present invention having an easily attachable and detachable front cover, approximate directional references will be specified with reference to FIG. 2 for the sake of brevity. Upward, downward, left, and right directions will be determined as viewed on the paper surface of the drawing, with a direction in which gravity acts with respect to a direction in which the front portion of a body frame 10 is viewed being determined to be the downward direction. In the detailed description of the present invention and the claims, directions will be specified and described based on this standard unless specially indicated otherwise.

Hereinafter, the fishing reel having an easily attachable and detachable front cover according to the present invention will be described with reference to the accompanying drawings.

Figure 3:
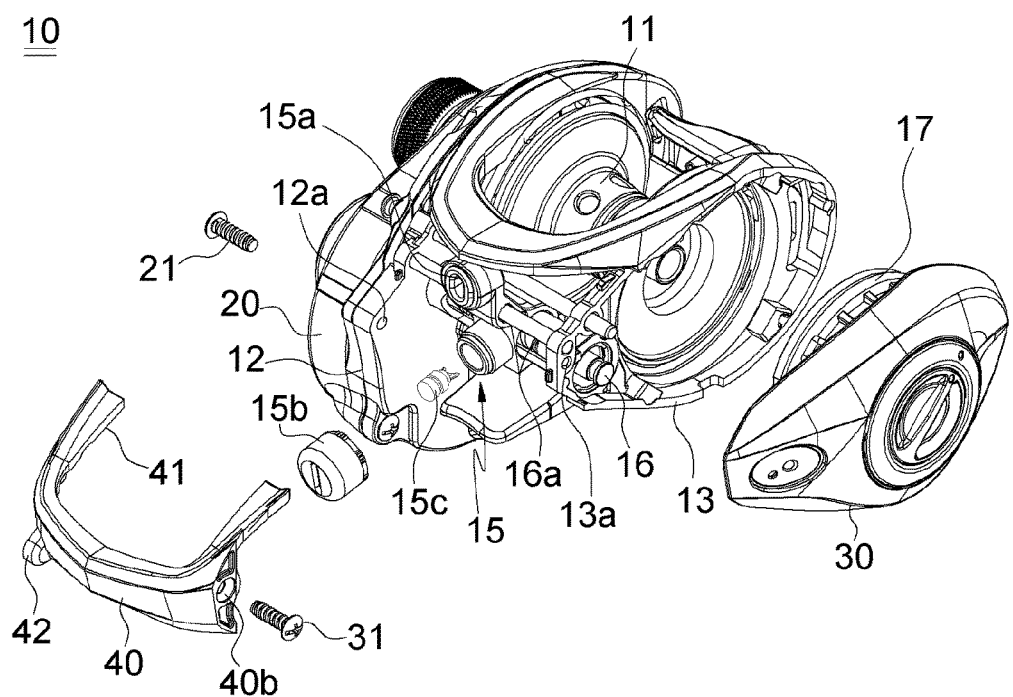

As illustrated in FIGS. 1 to 3, the present invention relates to the fishing reel including a body frame 10, a first side cover (or a gear-side cover) 20, a second side cover (or a palm-side cover) 30, and a front cover 40. The body frame 10 includes first and second connecting portions 12 and 13 on both side portions. The first side cover 20 is connected to the first connecting portion 12. The second side cover 30 is connected to the second connecting portion 13. The front cover 40 is connected to the front portion of the body frame 10 to protect a level wind 15.

Such a fishing reel has a guide hole 15a provided in the front end portion of the body frame 10, more particularly, in a level wind 15. The guide hole 15a allows a fishing line wound on the spool 11 to pass therethrough, thereby guiding the fishing line to a top portion of a fishing rod. The level wind 15 is configured to aid the fishing line to be uniformly wound on the entirety of the spool 11, so that the fishing line can be more easily unwound from the spool 11 during casting, thereby increasing a casting distance.

The level wind 15 is connected to a worm shaft 16 connected to the front end portion of the body frame 10 such that level wind 15 can rotate laterally in forward and backward directions. The worm shaft 16 has a bidirectional rail 16a on an outer circumferential surface.

When the fishing line is wound on or unwound from the spool 11, the worm shaft 16 rotates in concert with a spool shaft, and the bidirectional rail 16a causes the level wind 15 to laterally reciprocate in the longitudinal direction of the worm shaft 16. In this manner, the level wind 15 aids the fishing line to be wound and unwound.

In this fishing reel, a front cover 40 is connected to a portion of the body frame 10 in front of the level wind 15, i.e. the front portion of the body frame 10, to protect the level wind 15 from external impact.

Reference numeral 15A indicates a guide rod by which lateral reciprocal movement of the level wind 15 is guided. Reference numeral 17 indicates a spool cover having a shaft-connecting portion to which a spool shaft is axially connected. The spool cover 17 is connected to the second connecting portion 13 while covering a spool 11 to be used to attach and detach the spool 11. The reference numeral 18 indicates a pillar preventing the second side cover 30 from being completely detached from the body frame 10 when the second side cover 30 is pivoted to be opened.

In addition, the fishing reel according to the present invention may include all types of components or functions applicable to any known fishing reel, in particular, a bait casting reel without altering key features of the present invention which will be described later.

Key features of the present invention will be described with reference to FIGS. 2 and 3, which are exploded perspective views from which a configuration related to a handle H is removed.

First, the front cover 40 is disposed in front of the level wind 15, provided in the front portion of the body frame 10, to protect the level wind 15 from external impacts and, in the case of holding the fishing reel, prevent fingers from being injured by the operation of the level wind 15.

The front cover 40 has a streamlined curved structure so as not to interfere with an elliptical (or circular) planar shape of the body frame 10. The front cover 40 has connecting pieces 41 extending backward from both ends. The connecting pieces 41 are inserted into and fitted to the front portion of the body frame 10, more particularly, the front portions of the first and second connecting portions 12 and 13.

The front cover 40 has first and second coupling holes 40a and 40b in both outer surfaces. First and second bolt members 21 and 31 are fitted into the first and second coupling holes 40a and 40b to fix the front cover 40 between the first and second connecting portions 12 and 13.

In the case, according to the structure of a related-art fishing reel, the first and second bolt members 21 and 31 are coupled to the first and second connecting portions 12 and 13 by being inserted inward from the outer surfaces of the first and second connecting portions 12 and 13, and the heads of the first and second bolt members 21 and 31 are disposed within the first and second side covers 20 and 30.

In such a fishing reel, as described above, due to the second side cover 30 being simply openable and closable (i.e. most second side covers 30 have a pivotable (or rotatable) opening-closing structure using engagement protrusions without being bolt-coupled, because of the management or replacement of the spool 11, the management or adjustment of a braking means, or the like), it is easy to fasten the second bolt member 31, and there is no danger of detachment or loss of internal components protected by the second side cover 30.

In contrast, the first side cover 20 is less frequently opened and closed than the second side cover 30. In addition, the first side cover 20 protects various types and numbers of components, such as a bundle of screws, which aid the handle H, the spool 11, and the worm shaft 16 to work in concert with each other.

Thus, the first side cover 20 is bolt-coupled to the first connecting portion 12 of the body frame 10 using a plurality of bolts.

Thus, in the related-art fishing reel, when the first bolt member 21 is unscrewed or screwed to detach or attach the front cover 40, complete detachment of the first side cover 20 must be preceded. This consequently causes inconvenience and difficulty in the operation, as described above.

In this regard, according to the present invention, the first bolt member 21, bolt-coupling the front cover 40 to the front end portion of the first connecting portion 12, is coupled to the front cover 40 while being inserted inward from the outer surface of the first side cover 20, such that the head portion of the first bolt member 21 is exposed from the first side cover 20.

Since the first bolt member 21 for attachment to and detachment from the front cover 40 is coupled to the front cover 40 by extending through the first side cover 20, the head portion of the first bolt member 21 is exposed from the first side cover 20. Consequently, the front cover 40 can be attached and detached without complete detachment of the first side cover 20.

In particular, the first bolt member 21 is coupled to the front cover 40 by extending through both the first side cover 20 and the first connecting portion 12.

A structure in which the side cover 20 and the front cover are directly connected using the first bolt member 21 dedicated to the front cover 40 may be provided.

Since the first bolt member 21 according to the present invention is commonly used for coupling the first side cover 20 and the front cover 40, it is accordingly possible to more strongly and firmly maintain the coupling force of the front cover 40 while reducing the number of components used.

In this regard, the first side cover 20 and the first connecting portion 12 have bolt fastening holes 20a and 12a in positions corresponding to the first connecting hole 40a, such that threads of the first bolt member 21, inserted into the bolt fastening holes 20a and 12a, are screw-engaged with the first coupling hole 40a.

In addition, since the first bolt member 21 according to the present invention is commonly used for coupling not only the front cover 40 but also the first side cover 20, the first bolt member 21 must be firmly coupled to the first coupling hole 40a so that the first side cover 20 mounted on the first connecting portion 12 can also be safely coupled.

In this regard, the front cover 40 according to the present invention includes a coupling protrusion 42 protruding downward from the front end portion of one side surface in surface contact with the first connecting portion 12, such that the first bolt member 21 is coupled to the coupling protrusion 42.

That is, the coupling protrusion 42 is additionally provided on the front cover 40 such that the size and thickness of the first coupling hole 40a can appropriately be within limits without hindering an overall external appearance of the design of the fishing reel.

The first bolt member 21 having the above-described coupling structure is coupled while being screwed by the first bolt member 21, with the first side cover 20 and the first connecting portion 12 being situated between the head portion and the first coupling hole 40a, the coupling force between the first side cover 20 and the front cover 40 can be strongly maintained.

The present invention may provide another structure in which the connecting pieces 41 of the front cover 40 are provided in the inner surfaces of the second connecting portion 13, and the second bolt member 31 is screw-engaged with the second coupling hole 40b of the front cover 40.

In this structure, the connecting pieces 41 may be provided on the outer surface of the second connecting portion 13 to be protected by the second side cover 30 in order to safely mount the front cover 40 while increasing the coupling force of the front cover 40.

In this regard, the second bolt member 31 according to the present invention is coupled to the second connecting portion 13 while being inserted inward from the outer surface the second connecting portion 13.

In this regard, the second connecting portion 13 has a bolt hole 13a in a position corresponding to the second coupling hole 40b of the front cover 40, and the second bolt member 31 is inserted into the bolt hole 13a. Accordingly, threads of the second bolt member 31, inserted into the second coupling hole 40b of the front cover 40, are screw-engaged with the bolt hole 13a.

According to the present invention having the above-described structure, when the front cover 40 is recoupled after being detached, even in the case that the first side cover 20 is not completely detached in a position in which the second side cover 30 is opened by pivoting, the first and second bolt members 21 and 31 can be screwed or unscrewed. Since it is very simple to detach and attach the front cover 40, it is significantly easy to clean or replace the pin 15c after the level wind 15 is separated or detached. In addition, there is no danger of detachment or loss of components, which would otherwise be caused by complete opening of the first side cover 20. Accordingly, inexperienced and non-expert users can easily perform maintenance, repair, or the like to the level wind 15. This can accordingly reduce the burden of cost and time consumed for maintenance, repair, or the like of the level wind 15.

Although the present invention has been described with respect to the fishing reel having an easily attachable and detachable front cover in conjunction with the accompanying drawings, those skilled in the art will appreciate that various modifications, additions and substitutions are possible, without departing from the scope and spirit of the present invention as disclosed in the accompanying claims.

What is claimed is:

1. A fishing reel comprising:
  a body frame comprising first and second connecting portions on both side portions thereof and having a level wind on a front portion thereof;
  a gear-side, first side cover connected to the first connecting portion;
  a palm-side, second side cover connected to the second connecting portion; and
  a front cover connected to the front portion of the body frame to protect the level wind, wherein the front cover is bolt-coupled to a front end portion of the first connecting portion using a first bolt member, the first bolt member being coupled to the front cover while extending inward from an outer surface of the first side cover, such that a head portion of the first bolt member is exposed from the first side cover, the first bolt member is coupled to the front cover by extending through both the first side cover and the first connecting portion, and the front cover comprises a coupling protrusion protruding downward from a front end portion of a side surface in contact with the first connecting portion, with the first bolt member being coupled to the coupling protrusion.

2. The fishing reel according to claim 1, wherein the front cover is bolt-coupled to a front end portion of the second connecting portion using a second bolt member, the second bolt member being coupled to the second connecting portion by being inserted inward from an outer surface of the second connecting portion to extend through the front cover.

* * * * *